March 3, 1964    I. E. R. ÅKERMAN ETAL    3,123,093
MINIMUM PRESSURE DELIVERY VALVE ASSEMBLY
FOR MOTOR COMPRESSOR UNITS
Filed May 23, 1960
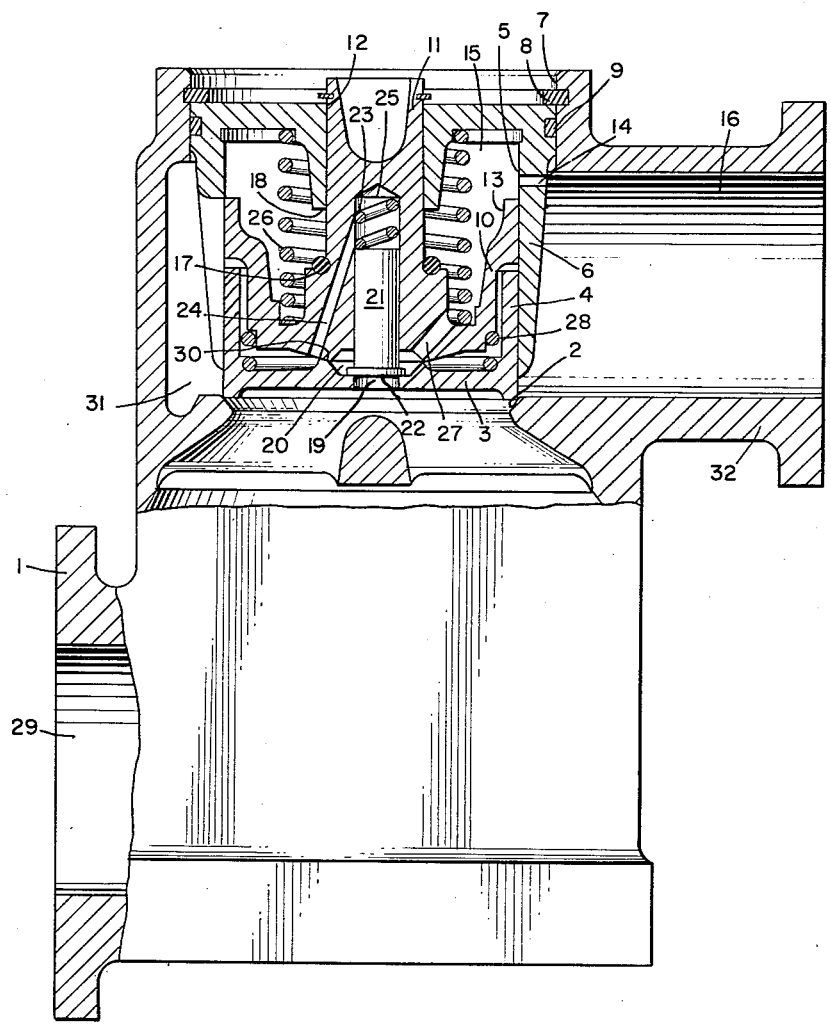
INVENTORS
IWAN ERNST ROLAND ÅKERMAN
JOZEF RIBBENS
BY *[signature]*
ATTORNEY

United States Patent Office 3,123,093
Patented Mar. 3, 1964

3,123,093
MINIMUM PRESSURE DELIVERY VALVE ASSEMBLY FOR MOTOR COMPRESSOR UNITS
Iwan Ernst Roland Åkerman, Antwerp, and Jozef Ribbens, Borgerhout, Antwerp, Belgium, assignors to Atlas Copco Aktiebolag, Nacka, Sweden, a corporation of Sweden
Filed May 23, 1960, Ser. No. 30,807
6 Claims. (Cl. 137—494)

This invention relates to a minimum pressure delivery valve assembly for motor compressor units having a discharge conduit leading to the valve assembly and a delivery conduit leading from the valve assembly. One object of the invention is to provide a delivery valve assembly which does not open until a predetermined minimum discharge conduit pressure has been reached and which opens fully as soon as a certain pressure below normal working pressure has been reached and which produces a negligible resistance to the air flow through the discharge conduit at normal working pressure. Another object of the invention is to prevent back flow from the delivery conduit to the compressor when the compressor is stopped. A further object of the invention is to prevent back flow from the delivery conduit to the compressor as soon as the flow of compressed air in the discharge conduit stops. A still further object of the invention is to provide a delivery valve assembly of this type which during normal operating conditions of the compressor has no leakage to the atmosphere. A still further object of the invention is to provide a delivery valve which prevents unduly high air speeds through the oil separator and filters of a compressor with cooling oil injection and oil separation after the compressor.

Other and more detailed objects and a preferred manner of carrying the invention into effect will become apparent from the ensuing portion of this specification in which there is described by way of example, but without limitation, a suitable example of apparatus embodying the invention.

In the accompanying drawing a minimum pressure delivery valve assembly according to the invention is illustrated by way of example in longitudinal section.

In the drawing 1 designates a casing forming a discharge conduit 29 leading to the delivery valve assembly from an air compressor (not illustrated) which may, for instance, be of the type in which oil is injected in the compression chambers of the compressor for sealing and cooling purposes, said oil being removed from the compressed air in a separator provided in the discharge conduit of the compressor between the compressor and the illustrated delivery valve assembly. A valve seat 2 is provided in the casing and forms an opening providing a communication between the discharge conduits 29 and a delivery conduit 16 provided in the portion 32 of the casing 1. A main check valve member 3 of disc type cooperates with said valve seat to open or close said communication, respectively. The check valve member 3 is provided with a peripheral tubular sleeve portion 4 which is slidably guided in a cylindrical bore 5 in a valve casing 6. The valve casing 6 is fitted in a bore 7 in the casing 1 and kept in place by a locking ring 8 and sealed in the bore by sealing means, such as an O-ring 9. An auxiliary valve member 10, which has a central cylindrical stem 11, is slidable in a bore 12 in the valve casing 6, said auxiliary valve having a peripheral sleeve portion 13 slidable in the bore 5 and operable to control a passage 14 in the valve casing 6 forming a communication between an auxiliary valve chamber 15 defined by the valve casing and the auxiliary valve member 10 and the delivery conduit 16 in the casing portion 32. The auxiliary valve member 10 carries an O-ring 17 at the inner end of the stem 11 which O-ring cooperates with an annular surface 18 on the valve casing when the auxiliary valve 10 is moved all the way up in the figure.

The check valve member 3 is provided with a passage 19 forming a communication through the check valve member from the discharge conduit to a pilot chamber 20 confined by cooperating annular surfaces 30 on the members 3, 10 and formed between the auxiliary valve member 10 and the check valve member 3. An auxiliary check valve 21 is slidable in the cylindrical stem 11 of the auxiliary valve member 10 and has a valve surface 22 urged towards the main check valve member by a very weak spring 23 to close the passage 19. A passage 24 in the auxiliary valve member forms a communication between the delivery conduit 16 and a space 25 in the stem 11 accommodating the spring 23 and a fluid pressure in passage 24 together with spring 23 move the auxiliary check valve 21 towards member 3 as soon as the pressure in the discharge conduit 29 is close to said fluid pressure. A spring 26 is interposed between the auxiliary valve member 10 and the valve casing 6, said spring having such tension as to substantially balance a reduced air pressure on the area of the stem 11 which air pressure is the minimum air pressure to be maintained in the discharge conduit 29. The auxiliary valve member 10 is provided with a passage 27 forming a communication between the chamber 20 and the auxiliary valve pilot chamber 15 and having greater capacity than the passage 14 between the chamber 15 and the delivery conduit 16. A very weak spring 28 is interposed between the auxiliary valve member 10 and the check valve member 3. The discharge conduit 29 communicates with the outlet of the oil separator of the compressor.

The minimum pressure delivery valve assembly above described operates in the following manner:

It is assumed that the compressor is at rest and that atmospheric pressure prevails in the discharge conduit 29 and the delivery conduit 16. The various parts of the delivery valve assembly are then in the positions illustrated in the drawing. If the delivery conduit is connected to a compressed air consumer such as a number of air driven tools or a distributing network for supplying compressed air to such tools and the compressor is started, pressure at first builds up in the discharge conduit 29. At a very low pressure in the discharge conduit 29 above the pressure in the delivery conduit 16 the auxiliary check valve 21 opens the passage 19 so that compressed air flows into the pilot chamber 20 and through the passage 27 to the auxiliary valve chamber 15. When an intermediate minimum air pressure in the discharge conduit 29 and the chamber 15 has been built up, for instance 4 kilogrammes per square centimeter (kgs./cm.$^2$) above atmospheric, the auxiliary valve member 10 and the check valve member 3 are raised from the seat 2 so that air starts to flow through the opening 31 to the delivery conduit 16. The minimum air pressure in the discharge conduit 29 is during this period of operation reduced to any low pressure prevailing in the delivery conduit 16. If the capacity of the compressor is sufficient the pressure in the discharge conduit 29 increases and acting on the area of the stem 11 moves the auxiliary valve member 10 upwards in the figure. Such movement occurs at a predetermined value, for instance 5 kgs./cm.$^2$ above atmospheric, and the auxiliary valve member 10 is then fully open and has landed the sealing ring 17 on the surface 18 so as to prevent any leakage through the bore 12 to the atmosphere. Simultaneously the check valve 3 has moved to open position against the pressure of the very weak spring 28. Compressed air is then delivered through the annular space 31 from the discharge conduit 29 to the delivery conduit 16 without appreciable throttling, the pressure drop being only the very small pressure necessary to overcome the action of the weak spring 28 on the main check valve member 3.

As long as air is flowing through the discharge conduit at normal working pressure, for instance 7 kgs./cm.$^2$ above atmospheric, the delivery valve assembly is kept in fully open position. When air consumption is interrupted and fluid flow through the delivery valve ceases, the check valve member 3 is immediately closed by the soft spring 28 and simultaneously the auxiliary check valve 21 in closed position moves together with the check valve 3. The auxiliary valve member 10, however remains open as long as a pressure above the minimum intermediate pressure (for instance 4 kg./cm.$^2$) prevails in the delivery conduit 16. When air consumption was interrupted and the operation of the compressor stops or the compressor is unloaded. The main check valve 3 and the auxiliary check valve 21 then prevent air flow from the delivery conduit 16 to the discharge conduit 29 and consequently no back flow of air through the oil separator of the compressor, the compression chambers and the intake air filter can take place which is of particular importance when two or more compressors are connected to the same delivery conduit and it may be desired to stop one compressor while the other is running. If the pressure in the delivery conduit 16 drops below the predetermined minimum intermediate value, for instance 4 kg./cm.$^2$ above atmospheric, the auxiliary valve member 10 is moved to the position in which it rests against the main check valve member 3. It would be clear from the above description that the minimum pressure valve according to the invention prevents excessive air speeds in compressor filters, oil separators, and other parts of a motor compressor unit if the delivery conduit pressure is reduced below a predetermined minimum value. It is also impossible with the invention to consume compressed air from the compressor before the discharge conduit pressure of the compressor has reached the intermediate minimum pressure, for instance 4 kilogrammes per square centimeter above atmospheric. As long as a pressure drop exists between the discharge conduit 29 and the delivery conduit 16 and the pressure in the discharge conduit is below the minimum pressure an air flow is maintained through the passage 14 which serves to prevent freezing of the valve assembly.

The delivery valve assembly above described and illustrated on the drawings should only be considered as an example and may be modified in various different ways within the scope of the following claims.

What we claim is:

1. A delivery valve assembly for motor compressor units comprising, a discharge conduit, a valve casing forming a part of the discharge conduit, a delivery conduit forming a part of said casing, a valve seat in said discharge conduit, a main check valve member seatable on said seat for controlling flow from said discharge conduit to said delivery conduit, a chamber in said casing intermediate said seat and said delivery conduit, an auxiliary valve member slidable in said chamber, said auxiliary valve member having an inner face and an outer face having a greater effective area than said inner face, a spring in said chamber abutting said inner face normally biasing an annular projecting portion of said outer face against said main check valve member forming a second chamber between said members, means communicating the other portion of said outer face and the downstream side of said main check valve with said delivery conduit, a relatively weak spring intermediate said main and auxiliary check valve members, an opening in said main check valve member in communication with said second chamber, a valve in said second chamber normally closing said opening, a passage in said auxiliary valve member providing communication between said chambers and a leak passage providing communication between said first mentioned chamber and said delivery conduit.

2. A minimum pressure delivery valve assembly for motor compressor units having a discharge conduit leading to said valve assembly and a delivery conduit leading from said valve assembly for transmission of fluid pressure therethrough from said compressor unit, comprising in combination a valve casing for said valve assembly and interconnecting said discharge and delivery conduits, a valve opening in said casing communicating between said casing and said discharge conduit and forming a valve seat, a main check valve member seatable on said seat for controlling flow from said discharge conduit to said delivery conduit and for interrupting flow in the reverse direction, a first chamber in said valve casing intermediate said valve opening and said delivery conduit, an auxiliary valve member slidable in said first chamber and having an outer face disposed toward said discharge conduit and an inner face oppositely disposed with said outer face having a greater effective pressure-responsive area than said inner face, means forming an abutting projection between said auxiliary valve member and said main check valve member defining therebetween a second chamber when said members are in abutting relation, first spring means in said first chamber and effective upon said auxiliary valve member for normally biasing said member into abutting relation with said main check valve member in the absence of an oppositely directed minimum fluid pressure effective upon said outer face of said auxiliary valve member, means forming flow communication from said delivery conduit into said second chamber between said auxiliary and main check valve members, means forming flow communication from said discharge conduit into said second chamber through said main check valve member, and a second spring relatively weaker than said first spring and effective between said auxiliary and main check valve members for normally biasing said main check valve member away from said auxiliary valve member and out of said abutting relation therewith, said first spring providing substantially the only force acting on said auxiliary valve member in opposition to fluid pressure in said second chamber and effective on said outer face of said auxiliary valve member.

3. A minimum pressure delivery valve assembly as recited in claim 2 which also includes means forming flow communication between said first and second chambers through said auxiliary valve member, and an additional leakage passage communicating between said first chamber and said delivery conduit.

4. A minimum pressure delivery valve assembly as recited in claim 2 which also includes a pilot valve for controlling said flow communication means through said main check valve member from said discharge conduit into said second chamber and including relatively weak biasing means normally biasing said pilot valve into closed position and for permitting opening thereof at a relatively minor pressure increase in said discharge conduit over the pressure in said delivery conduit.

5. A minimum pressure delivery valve assembly as recited in claim 2 in which the biasing forces of said first and second springs are responsive to and overcome by a predetermined minimum pressure in said discharge conduit for opening both said main check valve and auxiliary valve members when said minimum pressure is achieved in said discharge conduit and for closing said main check valve member when the pressure in said delivery conduit drops a predetermined substantial amount below the pressure in said delivery conduit preventing reverse flow through said conduits back to said compressor unit.

6. A minimum pressure delivery valve assembly as recited in claim 2 in which said auxiliary valve member also includes means communicating through said valve casing for imposing on a portion of said auxiliary valve member the effect of atmospheric pressure outside said casing urging said member in the same direction as said first spring means, and additional valve seat means on said auxiliary valve member and said valve casing for sealing engagement in the open position of said auxiliary valve member preventing leakage of fluid pressure from said first chamber through said means communicating through said valve casing.

References Cited in the file of this patent
UNITED STATES PATENTS

| | | |
|---|---|---|
| 382,643 | Fox | May 8, 1888 |
| 1,209,796 | Anderson | Dec. 26, 1916 |
| 2,365,892 | McLeod | Dec. 26, 1944 |
| 2,704,035 | Bader | Mar. 15, 1955 |
| 2,727,529 | Kodet | Dec. 20, 1955 |